US008027981B2

(12) United States Patent
Episale et al.

(10) Patent No.: US 8,027,981 B2
(45) Date of Patent: Sep. 27, 2011

(54) SYSTEM, METHOD AND PROGRAM PRODUCT FOR CLASSIFYING DATA ELEMENTS INTO DIFFERENT LEVELS OF A BUSINESS HIERARCHY

(75) Inventors: James D. Episale, Binghamton, NY (US); Mark A. Musa, Brackney, PA (US); David G. Ruest, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/332,283

(22) Filed: Dec. 10, 2008

(65) Prior Publication Data
US 2010/0145945 A1 Jun. 10, 2010

(51) Int. Cl.
*G06F 7/00* (2006.01)
*G06F 17/30* (2006.01)

(52) U.S. Cl. .................. 707/740; 707/603; 707/776
(58) Field of Classification Search .................. None
See application file for complete search history.

(56) References Cited

U.S. PATENT DOCUMENTS

| 5,930,392 | A * | 7/1999 | Ho | 382/224 |
|---|---|---|---|---|
| 7,454,427 | B2 * | 11/2008 | Jackson | 1/1 |
| 7,630,956 | B2 * | 12/2009 | Wyatt et al. | 1/1 |
| 2004/0024773 | A1 * | 2/2004 | Stoffel et al. | 707/102 |
| 2004/0064456 | A1 | 4/2004 | Fong et al. | |
| 2004/0230471 | A1 | 11/2004 | Putnam Brookes | |
| 2005/0065910 | A1 | 3/2005 | Welton et al. | |
| 2005/0112530 | A1 | 5/2005 | Dinger et al. | |
| 2006/0143034 | A1 * | 6/2006 | Rothermel et al. | 705/1 |
| 2006/0259507 | A1 * | 11/2006 | Higuchi | 707/102 |
| 2007/0185867 | A1 * | 8/2007 | Maga et al. | 707/6 |
| 2008/0243876 | A1 * | 10/2008 | Godoy et al. | 707/100 |
| 2009/0018996 | A1 * | 1/2009 | Hunt et al. | 707/2 |

OTHER PUBLICATIONS

Kamber et al. "Generalization and Decision Tree Induction: Efficient Classification in Data Mining", IEEE, 1997.*
Srivastava et al. "Parallel Formulation of Decision-Tree Classification Algorithms", Data Mining and Knowledge Discovery, vol. 3 Issue 3, Sep. 1999.*

* cited by examiner

*Primary Examiner* — Shew-Fen Lin
(74) *Attorney, Agent, or Firm* — John R. Pivnichny; Law Office of Jim Boice (57) ABSTRACT

A method, system and program product for classifying data elements into different levels of a business hierarchy. The method includes identifying data elements to be classified into one or more levels of a business hierarchy, selecting a first logic decision tree for evaluating the data elements identified for classification into the hierarchy and executing the first tree for recursively evaluating each data element identified until the first tree has been traversed. Further, the method includes dynamically creating configurable anchor point classifications for the data elements evaluated through the first tree and assigning a respective anchor point classification to each data element evaluated, such that, a respective anchor point classification assigned to a data element evaluated links the data element to a lowest level of the hierarchy, and where the anchor point classification conveys classification information as to each higher level of the hierarchy that the data element belongs to.

19 Claims, 7 Drawing Sheets

SYSTEM, METHOD AND PROGRAM PRODUCT FOR CLASSIFYING DATA ELEMENTS INTO DIFFERENT LEVELS OF A BUSINESS HIERARCHY

FIELD OF THE INVENTION

The present invention relates to computer systems and software, and more specifically to an automated technique for classifying data elements or data facts in a business hierarchy for facilitating hierarchical summarizing and reporting of the business data across the business.

BACKGROUND OF THE INVENTION

A foundational concept in Information Warehouses and reporting against such warehouses is the concept of reporting hierarchies. An example of a reporting hierarchy would be a geography hierarchy. For example, city belongs to a county, a county to a state, a state to a country, a country to a continent, a continent to a hemisphere. A portion of a business might use this particular hierarchy. However, a similar geography hierarchy could also include the fact that a country belongs to a sales region, a sales region belongs to a marketing area, and a marketing area belongs to a sales geography. These combinations are endless and can change based on the business function that is doing the reporting. There are other hierarchy types, like organizations or commodities (product types). There are certain common concepts to hierarchies and then there are unique differences in hierarchies. Aggregating data from many corporations in one information warehouse requires supporting many hierarchy types (commodity, geography, organization, etc), and requires supporting the unique hierarchy needs of any corporation for a given hierarchy. The hierarchies could have different numbers of levels based on the corporation and the hierarchy type, and each level could have a different label and a different meaning. As such, there is a need to provide new ways to facilitate hierarchical reporting or summarizing of data across a business or corporation.

SUMMARY OF THE INVENTION

The present invention resides in a system, method and program product for classifying data elements in a business hierarchy for facilitating hierarchical reporting of the data across the business. The method includes identifying a plurality of data elements stored in a data warehouse system to be classified into one or more levels of a business hierarchy, selecting a first logic decision tree of one or more logic decision trees for evaluating the plurality of data elements identified for classification of the one or more date elements into the one or more levels of the business hierarchy and executing the first logic decision tree for recursively evaluating each data element of the plurality of data elements identified until the first logic decision tree has been traversed. Further, the method includes dynamically creating configurable anchor point classifications for the plurality of data elements evaluated through the first logic decision tree and assigning a respective anchor point classification to a respective data element evaluated, wherein the respective anchor point classification assigned to a respective data element evaluated links the respective data element to a lowest level of the one or more levels of the business hierarchy, and wherein the respective anchor point classification assigned to the respective data element of the plurality of data elements conveys classification information as to each higher level of the one or more levels of the business hierarchy that the respective data element belongs to. In an embodiment, the method further includes running each data element of the plurality of data elements through a second logic decision tree of the one or more logic decision trees for further classification of the plurality of data elements identified into the one or more levels of the business hierarchy. In an embodiment, the identifying step further includes loading the plurality of data elements into a fact table in the data warehouse system. In an embodiment, the selecting step further includes providing a business rules database including of the one or more logic decision trees corresponding to the one or more levels of the business hierarchy for classification of the plurality of data elements into the one or more levels of the business hierarchy, wherein each logic decision tree of the one or more logic decision trees includes a binary decision tree. In an embodiment, the method further includes evaluating, using the first logic decision tree, the each data element of the plurality of data elements for determining the respective anchor point classification of the each data element into the one or more levels of the business hierarchy. In an embodiment, the assigning step further includes associating the respective anchor point classification dynamically created with the respective data element of the plurality of data elements, using one or more attributes of the respective data element. In an embodiment, the method further includes generating a report utilizing the respective anchor point classifications assigned to the plurality of data elements, wherein the report summarizes the plurality of data elements from a lower level up to a higher level of the one or more levels of the business hierarchy.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
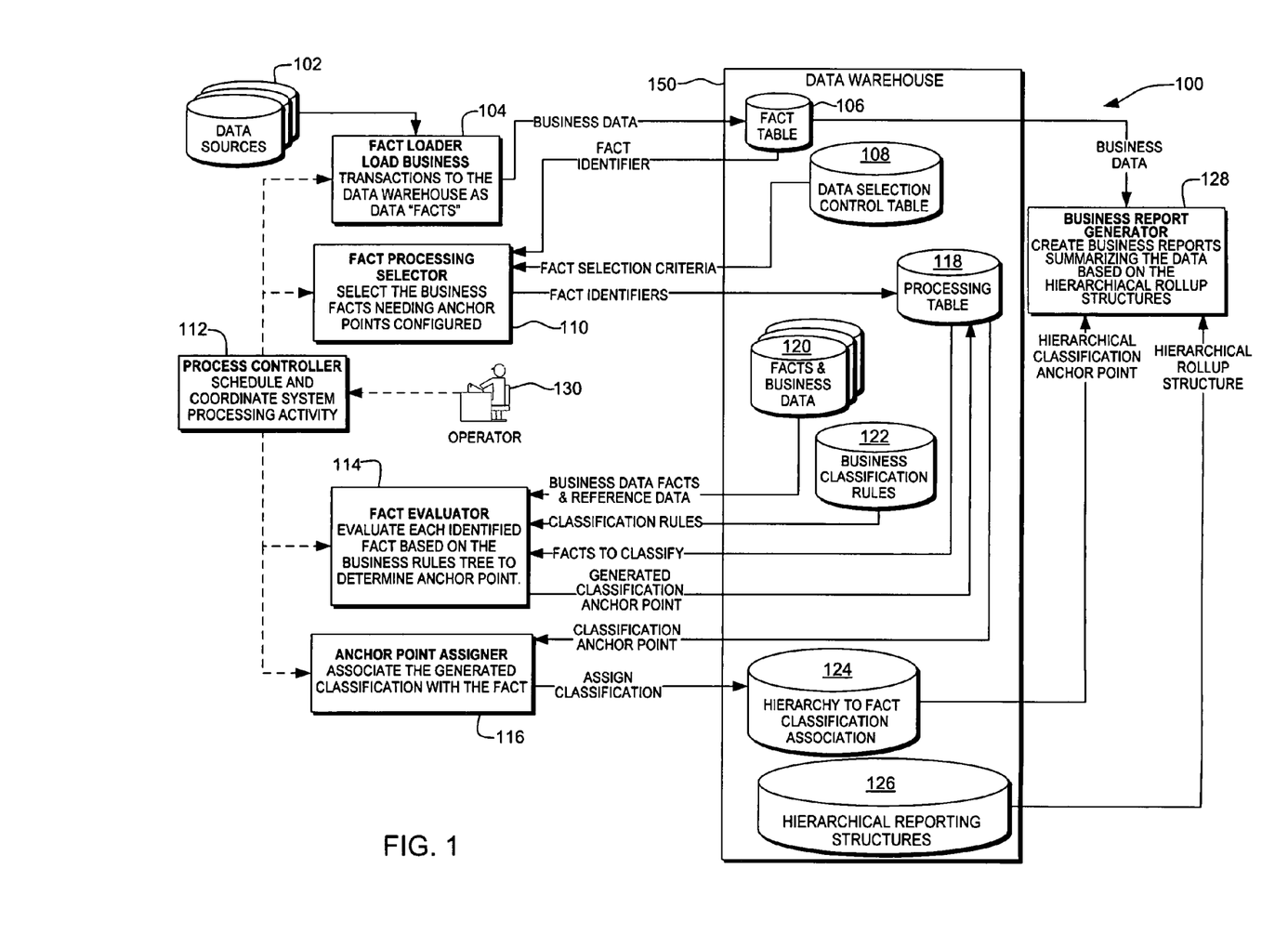
FIG. 1 is a schematic block diagram of a data warehouse infrastructure for classifying data elements in a business hierarchy for facilitating hierarchical reporting of the data across the business, in accordance with an embodiment of the present invention.

Reference is now made to FIG. 1 reference numeral 100, which illustrates an embodiment of a computer infrastructure 100 for classifying business data in a business hierarchy for facilitating hierarchical reporting of the business data across multiple hierarchies of a business, in accordance with an embodiment of the invention. As used herein, a hierarchy is a data structure where a child node has one and only one parent node. Turning to FIG. 1, FIG. 1 depicts a schematic block system diagram illustrating one embodiment of a computer infrastructure 100, which includes one or more business data sources 102 that contains business data or data elements or data facts or records, such as, invoices, purchase orders, etc., which contain supplier identifiers, supplier numbers, purchase order numbers, etc. to be processed using business rules. A fact loader program 104 (simply referred to as a fact loader) loads the various business data or facts collected from the various data sources 102 into a fact table 106 (also referred to herein as data fact table) within a data warehouse system 150. A fact processing selector program 110 (simply referred to as a fact processing selector) selects or marks the business data or business data facts stored in the fact table 106 that need entry points or anchor points created or updated for classifying the business data into a business hierarchy, such that, the business data can be rolled up or summarized from a low level up to a higher level in the hierarchy. A base capability of roll up reporting is the ability to associate a data fact (for example, a specific invoice line item) to the lowest level of the hierarchy. This association of a specific data fact to the lowest level in the hierarchy can be referred to as anchor point association. The fact processing selector 110, in an embodiment, utilizes a data selection control table 108 and a processing table 118 within the data warehouse system 150. In an embodiment, the data selection control table 108 provides selection criteria for the data facts to be selected for processing. Further, the fact processing selector 110 ascertains facts to be processed and stores the associated fact identifiers in the processing table 118. Further, in an embodiment, the business data facts along with their fact identifiers and other business reference data are stored in one or more tables 120 within the data warehouse system 150. In an embodiment, the data warehouse system 150 stores business classification rules 122 (also referred to herein as business rules or classification rules) that are to be applied to the business data facts 120 being evaluated for classifying the data facts or data elements 120 in a business hierarchy. In an embodiment, the fact evaluator rules processor program 114 (simply referred to as a fact evaluator) evaluates each data fact identified in the processing table 118 and stored in the tables 120 utilizing reference data stored in the tables 120 and applies one or more business rules 122 to determine or assign an anchor point or entry point value for a particular data fact or element being evaluated, such that, the anchor point value can be used for rolling up or summarizing the data fact from a low level up to a higher level of a hierarchy. In an embodiment, the business classification rules comprises of one or more logic decision trees for evaluating the data facts or elements identified as needing classification into the one or more levels of the business hierarchy. The fact evaluator 114 utilizes the business classification rules 122 to classify each of the business data facts for creating or generating the classification anchor point or entry point values (also referred to herein as simply anchor points or entry points), which provide linkage of the data facts into the business hierarchy. The anchor point assignment rules processor 116 (simply referred to as an anchor point assigner) associates or assigns the classification anchor point values generated or determined to the respective data facts and stores the anchor point or entry point classification in a hierarchy-to-fact classification association table 124 within the data warehouse system 150. Further, a business report generator 128 uses data facts stored in the fact table 106, the hierarchy-to-fact classification association table 124 and the hierarchical reporting or rollup structures 126 within the data warehouse system 150 to create business reports summarizing the business data based on the hierarchical reporting or rollup structures utilized. Further, in an embodiment, an operator 130 utilizes a process controller 112 to schedule and coordinate system processing activity utilizing the fact loader program 104, fact processing selector program 110, fact evaluator program 114 and the anchor point assigner program 116. Additionally, in an embodiment, the fact loading process (performed by the fact loader program 104), fact processing selection process (performed by the fact processing selector program 110), fact evaluation process (performed by the fact evaluator program 114), and anchor point assigner process (performed by the anchor point assigner program 116) are each designed as independent processes, where each of the processes can be separately executed and optimized independent of the other steps in the process. This design allows for varying execution models depending on the volumes, complexity, and criticality of the data being processed.

Figure 2:
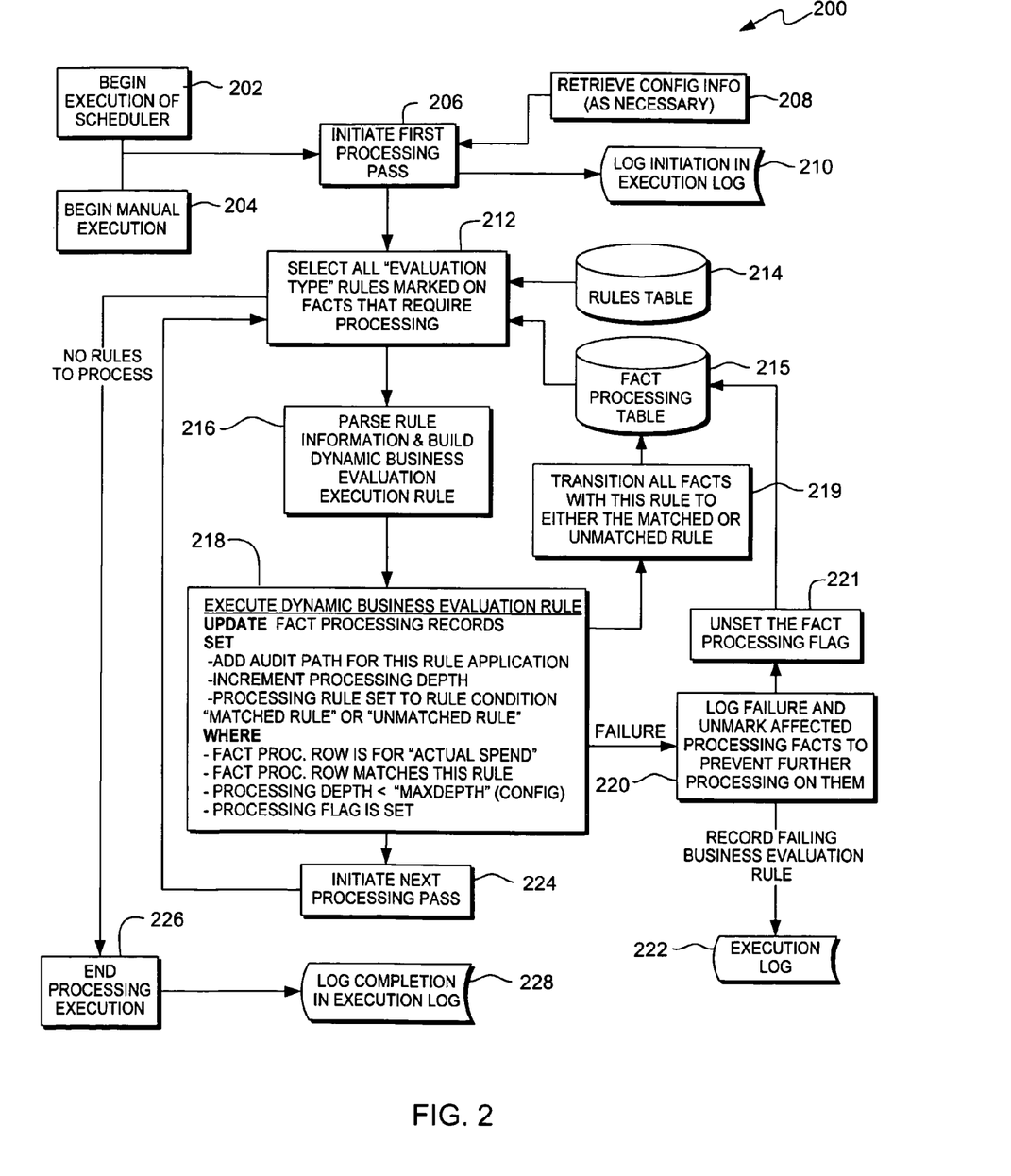
FIG. 2 is a schematic diagram depicting the steps performed by a fact evaluator rules processor program for evaluating data facts using logic decision trees to determine or dynamically assign anchor points created for each identified business fact evaluated, in accordance with an embodiment of the present invention.

In another embodiment, the invention provides a method or process for dynamically assigning anchor points that are created for each identified business fact evaluated in order to classify data elements or facts into one or more hierarchies in a business, in accordance with an embodiment of the present invention. Reference is now made to FIG. 2, reference numeral 200, which outlines the steps performed by a fact evaluator rules processor program for evaluating data facts using one or more logic decision trees to determine or dynamically assign anchor points created for each identified business fact evaluated, in accordance with an embodiment of the present invention. As shown in FIG. 2, the data facts or facts to be processed by a fact evaluator rules processor begins with either the automatic execution of a scheduler (step 202) for processing data facts or begins with manual execution (step 204) by a user of the fact evaluator rules processor for processing data facts. The fact evaluator rules processor initiates in step 206 a first processing pass of the data facts to be evaluated. In an embodiment, the fact evaluator rules processor utilizes or retrieves configuration information (step 208), as needed. Further, the fact evaluator rules processor logs in step 210 initiation of the first processing pass in an execution log. In step 212, the fact evaluator rules processor selects all "evaluation type" rules that are marked or flagged for evaluating data facts that require processing. In an embodiment, the fact evaluator rules processor utilizes the business rules stored in table 214, which are associated with the current state of the fact evaluations as identified in the fact processing table 215 for data facts needing anchor points. However, if the fact evaluator rules processor determines that there are no "evaluation type" rules to be processed for data facts identified as needing anchor points configured, then the fact evaluator rules processor ends process execution in step 226 and logs completion of the processing pass initiated in an execution login step 228. Further, the fact evaluator rules processor parses in step 216 the rule information marked on the identified data facts and builds a dynamic business evaluation rule. The fact evaluator rules processor executes the dynamic business evaluation rule in step 218 against all facts awaiting the evaluation as indicated in the processing table 215, where the fact evaluator rules processor transitions in step 219 all facts with the business evaluation rule to either a "matched" rule or "unmatched" rule and updates the data facts in the fact processing table 215. Further, upon execution of the business evaluation rule, if the fact evaluator rules processor determines that the processing pass is successful, then the fact evaluator rules processor initiates a next processing pass (step 224) and the process returns to step 212, where the fact evaluator rules processor selects all "evaluation type" rules that are marked or flagged for evaluating data facts that require processing and performs steps 216 and 218. However, on the other hand, if the fact evaluator rules processor determines that the first processing pass is not successful, then the fact evaluator rules processor logs in step 220 the failure and unmarks or unsets (in step 221) the fact processing flags associated with the affected data facts processed to prevent further processing of the data facts, and updates the data facts stored in the fact processing table 215. Further, the fact evaluator rules processor records or logs the failing SQL rule in an execution log in step 222. Going back to step 212, if the fact evaluator rules processor determines that there are no "evaluation type" rules to be processed, the fact evaluator rules processor ends process execution in step 226 and logs completion of the processing pass initiated in an execution log 228. Accordingly, the fact evaluator rules processor utilizes the rule table 214 to recursively process all entries in the fact processing table 215 until the entries have traversed the rule tree and have reached an assignment rule (also abbreviated and referred to herein as RA) at one of the leaf nodes, as explained further herein below with respect to FIG. 4.

Figure 3:
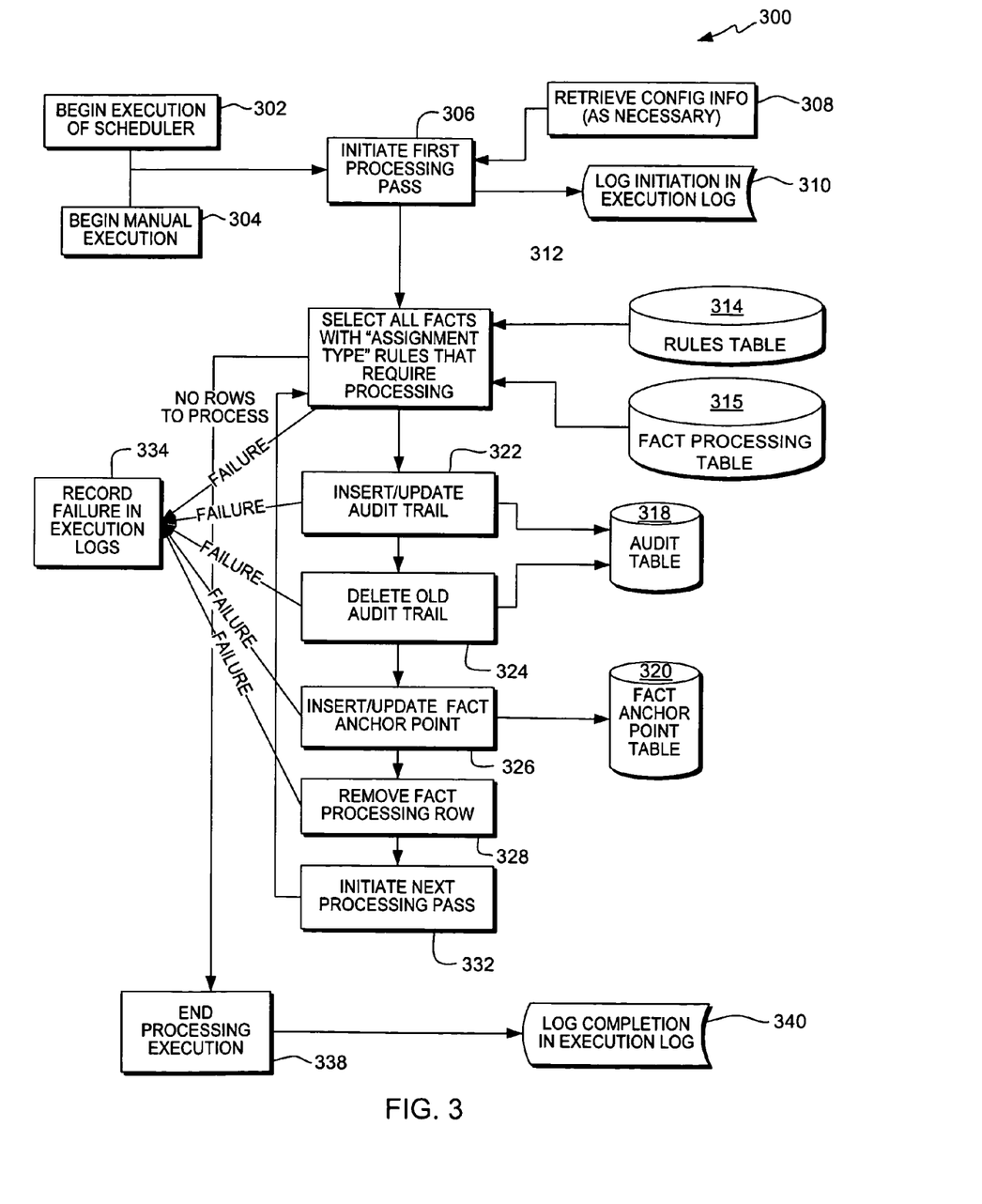
FIG. 3 is a schematic diagram depicting the steps performed by an anchor point assignment rules processor program for assigning data facts to the lowest level of a business hierarchy for facilitating hierarchical reporting or summarizing of the data across the business, in accordance with an embodiment of the present invention.

Reference is now made to FIG. 3, reference numeral 300, which outlines the steps performed by an anchor point assigner or anchor point assignment rules processor for creating hierarchy to data facts associations, based on the evaluations performed by the fact evaluator rules processor as discussed with respect to FIG. 2, using logic decision trees to determine or dynamically assign anchor points that are dynamically created for each identified business fact evaluated, in accordance with an embodiment of the present invention. As shown in FIG. 3, the data facts or facts to be processed by an anchor point assignment rules processor begins with either the automatic execution of a scheduler (step 302) for processing data facts or begins with manual execution (step 304) by a user of the anchor point assignment rules processor for processing data facts. The anchor point assignment rules processor initiates in step 306 a first processing pass of the data facts to be evaluated and assigned anchor points or entry points for facilitating hierarchical reporting of the data across the business. In an embodiment, the anchor point assignment rules processor utilizes or retrieves configuration information (step 308), as needed. Further, the anchor point assignment rules processor logs in step 310 initiation of the first processing pass in an execution log. In step 312, the anchor point assignment rules processor selects all "assignment type" rules that are marked or flagged for data facts that have completed evaluations. In an embodiment, the anchor point assignment rules processor utilizes the business rules stored in table 314 and the associated facts identified in the fact processing table 315 as needing anchor points or entry points. However, if the anchor point assignment rules processor determines that there are no "assignment type" rules to be processed for facts identified, then the anchor point assignment rules processor ends process execution in step 338 and logs completion of the processing pass initiated in an execution login step 340. Further, the anchor point assignment rules processor inserts or updates in step 322 the evaluation and assignment audit trail in an audit table 318. The anchor point assignment rules processor deletes in step 324 old audit trails if previously evaluated or assigned. In step 326, the anchor point assignment rules processor inserts or updates the data fact with the anchor point and stores the fact with the anchor point in a table 320. Further, the anchor point assignment rules processor removes in step 328 the fact processing row from the fact processing table 315. Further, upon execution of the assignment rule, if the anchor point assignment rules processor determines that the first processing pass is successful, then the anchor point assignment rules processor initiates a next processing pass (step 332) and the process returns to step 312, where the anchor point assignment rules processor selects all "assignment type" rules that are marked or flagged for evaluating data facts that require processing and performs steps 316 through 332. In addition, if the anchor point assignment rules processor determines that an error has occurred at any of the steps 312, 322, 324, 326, and/or step 328, then the anchor point assignment rules processor records failure in one or more execution logs in step 334. Going back to step 312, if the anchor point assignment rules processor determines that there are no "assignment type" rules to be processed, the anchor point assignment rules processor ends process execution in step 338 and logs completion of the processing pass initiated in an execution log 340. Accordingly, the anchor point assignment rules processor assigns the data facts to the lowest level of the hierarchy entry point, as indicated by the assignment rule resulting from the fact processing.

As such, the fact evaluator program performing the steps discussed herein above with respect to FIG. 2 utilizes the fact processing table and the rules table to identify all the rules that need to be applied to a data element or fact, executes those rules and transitions the fact processing entries to the next node in the rule tree. The processing of data elements or facts is then repeated until no more fact processing data records or facts exist that require evaluation. Also, this process supports the creation of new fact processing entries during execution and is able to simply pick up and begin processing the new entries on the next iteration. Further, as soon as the fact processing entries transition to a leaf node or assignment rule, they are no longer in the scope of processing of the fact evaluator program and are immediately picked up by the anchor point assignment rules processor program (discussed herein above with respect to FIG. 3), which can be executing concurrently with the fact evaluator rules processor program.

Figure 4:
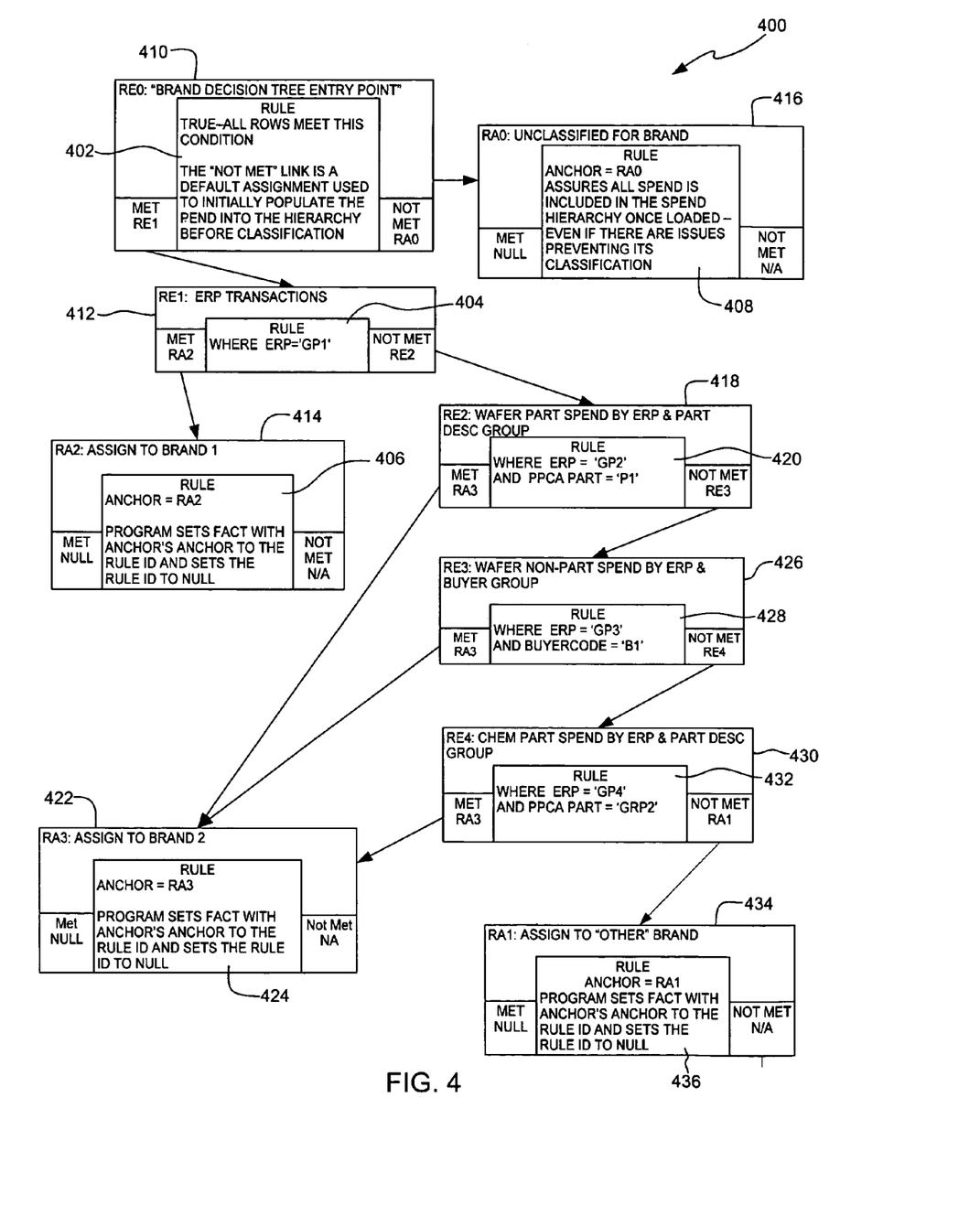
FIG. 4 depicts a data structure for a rules based decision logic tree for deriving or creating configurable anchor points for classifying data elements into a particular business hierarchy for facilitating hierarchical reporting of the data across the business, in accordance with an embodiment of the present invention.

Reference is now made to FIG. 4, which depicts an example of a data structure for a rules based decision tree, namely a binary decision tree for deriving or creating configurable anchor points for classifying data elements in a business hierarchy for facilitating hierarchical reporting of the data across the business, in accordance with an embodiment of the present invention. In particular, the rules based decision tree 400 represents a decision tree for classifying data elements into a brand hierarchy of a business. The logic decision tree or rule tree describes an embodiment by which the anchor points might be derived, and where changes to the mapping rules can be made to adjust and adapt the mapping process without requiring coding changes. In the logic decision tree or rule tree the internal nodes contain data evaluation rules whose evaluation results in a rule match or rule non-match condition facilitating tree traversal to either a "matched" (met) or "un-matched" (not met) child node for that rule. Individual traversal of the rule tree for each data element or fact results in the data element or fact reaching one of the tree's leaf nodes, which contains a data assignment rule that ends evaluation processing and governs the assignment of the data element to the appropriate level anchor point in the hierarchy. In an embodiment, the internal nodes contain data evaluation rules, whereas, the leaf nodes contain assignment rules for assigning the data fact into the hierarchy. Internal nodes can link to any other internal node and an evaluation path can proceed down multiple levels in one part of the tree then link to another internal node in a separate branch of the main tree. Evaluation of data facts or elements always commences from the logic decision tree's root node. The evaluation rule execution priority is imbedded in the tree linkage structure and implicitly carried out through traversal of the rule tree. The result of this execution priority is that given a data element, which is capable of matching multiple mapping rules paths through the tree, it is guaranteed that through execution that only a single path will be generated and, furthermore, that the same path will be found on every execution of that data element through that discrete version of the rule tree. In an embodiment, the rules based tree is implemented via a relational database configuration table, which can support the definition and storage of multiple rule trees via an association to the hierarchy which the rule set applies to. This construct allows for decision rule sets that can apply to different business data facts or elements as well as can support multiple hierarchies with differing rule sets to be built for a single type of data element allowing differing hierarchical views of the same data.

Turning to FIG. 4, reference numeral 400, each internal node, for instance, reference numeral 404, in the decision tree 400 contains a data evaluation rule (abbreviated and referred to herein as RE) whose evaluation results in a rule match or rule non-match condition facilitating tree traversal to either the "matched" child node for that rule or an "unmatched" child node for that rule. Further, the leaf nodes contain the assignment rules. As such, traversal of the decision rule tree for each data element or data fact results in the data element reaching one of the tree's leaf nodes which contains a data assignment rule (referred to herein as RA), for instance, reference numeral 406, which ends evaluation processing of the data facts and governs the assignment of the data element to the lowest level anchor point in the hierarchy, in this case, a brand hierarchy. In particular, each data fact that comes in is assigned to the top of the decision tree RE0 (reference numeral 410 in FIG. 4A) and gets a business rule applied to it and the business rule will either meet the business rule (met or pass) or not meet the business rule (not met or fail). The decision tree is traversed down until an assignment rule is eventually reached, so that an assignment can be made. The first node RE0 (reference numeral 410) is a starting point, which contains a business rule (reference numeral 402) that is always met. In an embodiment, as each data fact comes in it is pre-assigned into an "unclassified" branch of the hierarchy location represented by RE0's unreachable "not met" node RA0 (reference numeral 416). This pre-classification ensures all data facts are accounted for in the hierarchy, regardless of their state of classification. Once pre-assigned into the hierarchy, the data fact is assigned to the first evaluation node RE0 (reference numeral 410), which is always met, and the tree is traversed to node RE1 (reference numeral 412), which contains a data evaluation rule shown in the middle (reference numeral 404). If the data fact meets this rule 404, then the tree goes to the RA2 node (reference numeral 414), which is an assignment rule (referred to as RA), where an assignment of the data fact into a brand hierarchy is made. As shown in FIG. 4, business rule (RE1) in node 412 pertains to "ERP Transactions", where the business rule in node 412 is met if the data element "ERP" equals "GP1". However, it will be understood by one skilled in the art that the business rule 404 contained in decision node 412 can contain any business rule that is relevant to the business and is used by the business for classifying or categorizing a piece of data fact or data element into an appropriate classification in order to facilitate summarizing of the data for a particular business hierarchy based on the needs of the business. Going back to node reference numeral 412, if the rule 404 is not met, then the tree is traversed to the RE2 node (reference numeral 418), where the fact is evaluated against another evaluation rule (reference numeral 420). If the business rule 420 is met, then the tree is traversed to node RA3 (reference numeral 422), which contains an assignment rule (reference numeral 424), where the data fact is assigned into the hierarchy. Similarly, if the business rule 420 is not met, then the tree is traversed to RE3, where if the business rule is met, the tree is traversed to node RA3 (reference numeral 422), which assigns the fact to the brand hierarchy according to the business rule RE3 that was met. On the other hand, if business rule 428 is not met, then the tree is traversed to rule RE4 (reference numeral 430, where the data fact is evaluated against business rule 432. If the business rule 432 is not met, then the tree is traversed to node RA1 (reference numeral 434), which contains an assignment rule (reference numeral 436), where the data fact is assigned into a different category of the hierarchy according to the business rule RE4 that was met. The process described in FIG. 4 is repeated for each data fact, until the tree has been traversed and the data facts are assigned by the tree and there are no more data facts to be evaluated. In an embodiment, each evaluation rule execution is an atomic operation. Each node evaluation and execution is persisted to allow for real time parallel execution that can be stopped and restarted at will without loss of data or the need for reprocessing. Further, multiple rule sets stored within a common rule data store allow for support of data elements capable of being categorized into multiple hierarchies. In an embodiment, recursively linked evaluation rules are detected and processing terminates for data elements stuck in a recursive evaluation loop. It is understood by one skilled in the art that FIG. 4 shows one representation or embodiment of a binary decision tree that contains specific rules for representing a type of business data, where the business rules can be applied to the particular data facts in order to classify the data into one level of a particular hierarchy of the business and that other representations are possible. As such, the business rules contained within a decision tree can be modified or configured to fit the data facts for a business, such that, the data facts are categorized based on the business rules used by a business.

Figure 5:
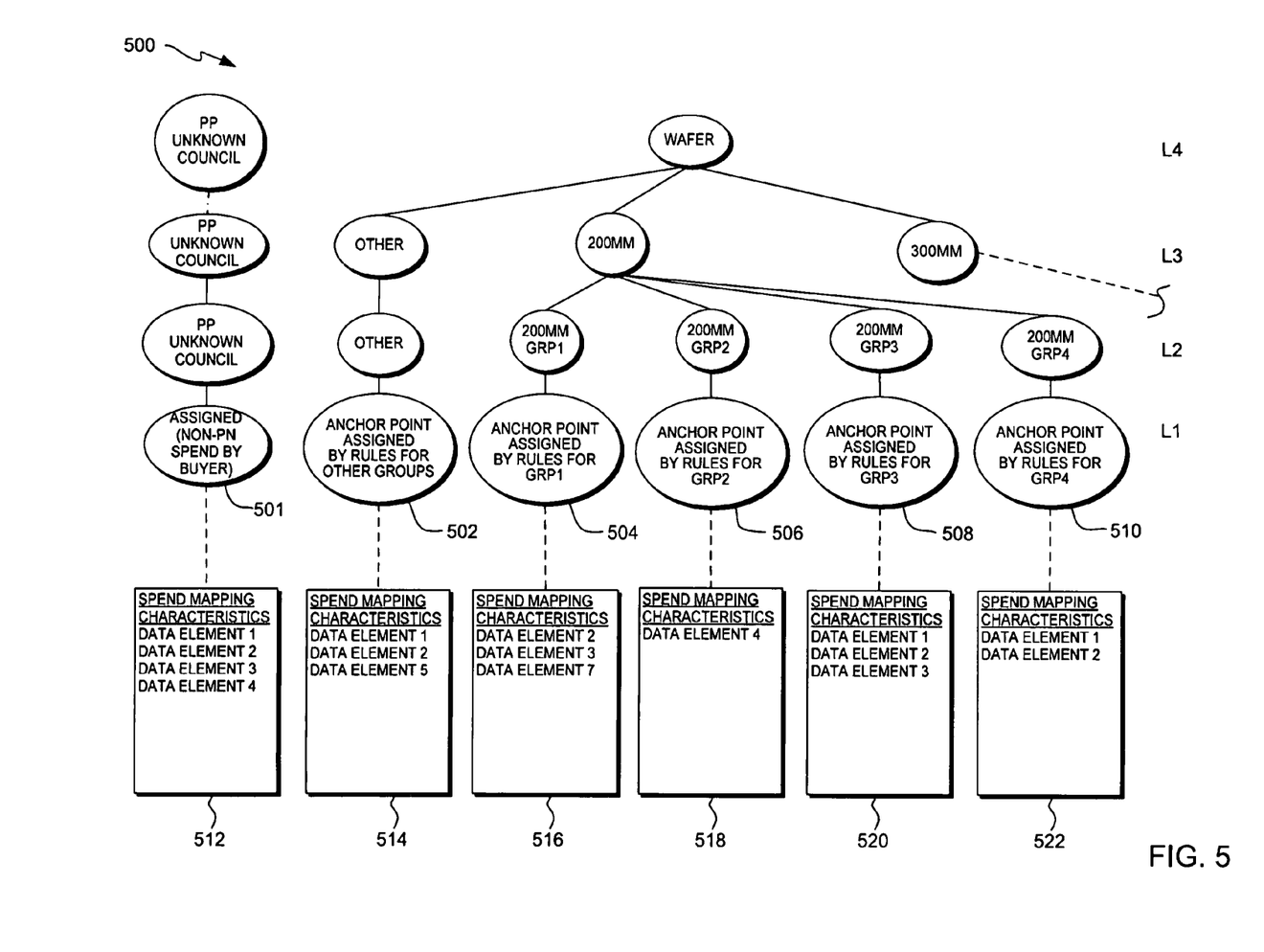
FIG. 5 depicts an example of a hierarchy and various attributes that may be used to map the data elements to a lowest level anchor point in the hierarchy for facilitating hierarchical reporting of the data across the business, in accordance with an embodiment of the present invention.

Reference is now made to FIG. 5, which depicts an example of a spend categorization hierarchy, where various spend attributes or characteristics are used to map the data facts or data elements to a lowest level anchor point or entry point of the hierarchy for facilitating hierarchical reporting or roll up or summarizing of the data across the business, in accordance with an embodiment of the present invention. Turning to FIG. 5, FIG. 5 represents a spend categorization hierarchy, where the spend data facts or data elements are categorized or classified according to a type of commodity council, such as, a wafer commodity council hierarchy (level 4, L4). In particular, as shown in FIG. 5, the wafer commodity council hierarchy includes four levels, level 1 (L1) through level 4 (L4), with level 1 (L1) being the lowest level and level 4 (L4) being the highest level of the wafer product or council spend hierarchy. In particular, every piece of data fact or data element pertaining to the wafer product or commodity council can be summarized or rolled up or linked from the lowest level L1 (level 1) to the next level up (for instance, L2 (level 2) and all the way up to L4 (level 4) of the hierarchy, using different criteria or characteristics for the spend data, such as, the one or more data elements or criteria or characteristics used by a specific department or group to categorize the data facts being evaluated into the wafer council hierarchy. As shown in FIG. 5, different data elements or mapping characteristics (reference numerals 512, 514, 516, 518, 520 and 522) are used to classify or categorize a data fact into the lowest levels of the wafer council commodity hierarchy. For instance, the wafer commodity can be categorized as either a "200 mm" wafer commodity or a "300 mm" wafer commodity (level 3, L3). If the wafer commodity being evaluated represents a "200 mm" wafer commodity (level 3, L3), the "200 mm" wafer commodity can be further categorized into different groups (level 2, L2), such as, group 1 (GRP 1), group 2 (GRP 2), group 3 (GRP 3), group 4 (GRP 4) or an "other" category (if the "200 mm" wafer commodity does not fit into one of the existing four groups). Similarly, the "300 mm" wafer commodity can be further categorized into different groups (not explicitly shown, but implied by the dotted line emanating from the "300 MM" wafer group). As such, every piece of wafer commodity spend data can be evaluated using one or more wafer commodity council logic decision trees in order to classify and assign the wafer data facts into a particular entry point of the wafer commodity council hierarchy, so that the wafer council spend data can be rolled up or summarized from level 1 (L1) to level 4 (L4), using the level 1 linkage or entry or anchor point value assigned to a data fact. For instance, the anchor point reference numeral 504, conveys the fact that the data fact gets rolled up to the "200 mm GRP 1" wafer (L2) and then gets rolled up to "200 mm" wafer family (L3) and up to the "wafer" commodity council (L4), whereas, the anchor point reference numeral 506, conveys the fact that the data fact gets rolled up to the "200 mm GRP 2" wafer (L2) and then gets rolled up to "200 mm" wafer commodity (L3) and up to the "wafer" commodity council (L4). Similarly, the anchor point reference numeral 508, conveys the fact that the data fact gets rolled up to the "200 mm GRP 3" wafer (L2) and then gets rolled up to "200 mm" wafer commodity (L3) and up to the "wafer" commodity council (L4), whereas, the anchor point reference numeral 510 conveys the fact that the data fact gets rolled up to the "200 mm GRP 4" wafer commodity (L2) and then gets rolled up to "200 mm" wafer commodity (L3) and up to the "wafer" commodity council (L4). Further, as shown in FIG. 5, any data fact that can be categorized as a wafer commodity, but cannot be further categorize as either a "200 mm" or a "300 mm" wafer commodity is categorized into an "other" category and is assigned an anchor point reference numeral 502. Furthermore, any data fact that cannot be categorized as a wafer commodity council is categorized and assigned an anchor point reference numeral 501, which signifies that the spend data does not belong in the wafer commodity council. Also, in an embodiment, each level 1 linkage or entry or anchor point value assigned for a piece of data fact evaluated is based on certain spend mapping characteristics used for categorizing a particular wafer commodity or product. For instance, anchor point 501 uses certain data elements or spend characteristics 512, namely, data elements 1, 2, 3 and 4, whereas, anchor point 502 uses spend characteristics 514, namely, data elements 1, 2 and 5. Similarly, anchor point 504 uses spend characteristics 516, namely, data elements 2, 3 and 7, whereas, anchor point 506 uses spend characteristics 518, namely, uses data element 4. In addition, anchor point 508 is shown as using spend characteristics 520, namely, data elements 1, 2 and 3 and anchor point 510 is shown as using spend characteristics 522, namely, data elements 1 and 2. As such, different wafer commodity spend data facts can be evaluated using one or more differing data elements through a wafer logic decision tree for categorizing and classifying the data facts into the lowest level of the wafer commodity hierarchy.

Figure 6:
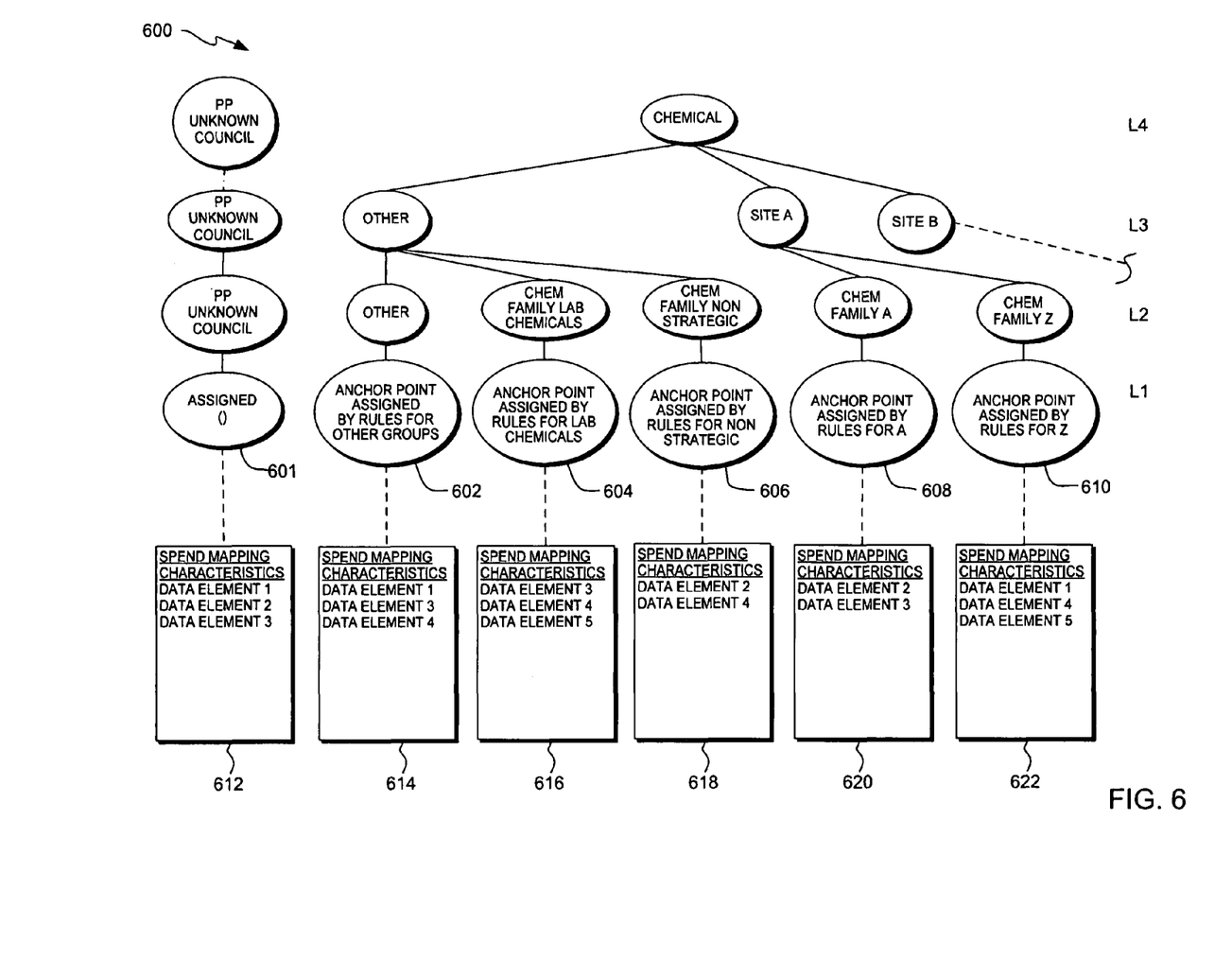
FIG. 6 depicts an example of another hierarchy and various attributes that may be used to map the data elements to a lowest level anchor point in the hierarchy for facilitating hierarchical reporting of the data across the business, in accordance with an embodiment of the present invention.

Reference is now made to FIG. 6, which depicts an example of another spend categorization hierarchy, where various spend attributes or characteristics are used to map the data facts or data elements to a lowest level anchor point or entry point of the hierarchy for facilitating hierarchical reporting or roll up or summarizing of the data across the business, in accordance with an embodiment of the present invention. Turning to FIG. 6, FIG. 6 represents a spend categorization hierarchy, where the spend data facts or data elements are categorized or classified according to a type of chemical council hierarchy (level 2, L2). In particular, as shown in FIG. 6, the chemical council hierarchy includes four levels, level 1 (L1) through level 4 (L4), with level 1 (L1) being the lowest level and level 4 (L4) being the highest level of the chemical family product or council spend hierarchy. In particular, every piece of data fact or data element pertaining to the chemical commodity council can be summarized or rolled up or linked from the lowest level L1 (level 1) to the next level up (for instance, L2 (level 2) and all the way up to L4 (level 4) of the hierarchy, using different criteria or characteristics for the spend data, such as, the one or more data elements or criteria or characteristics used by a specific department or group to categorize the data facts being evaluated into the chemical council hierarchy. As shown in FIG. 6, different data elements or mapping characteristics (reference numerals 612, 614, 616, 618, 620 and 622) are used to classify or categorize a data fact into the lowest levels of the chemical commodity council hierarchy. For instance, the chemical commodity or product can be categorized as either a "Site A" chemical product or a "Site B" chemical product (level 3, L3). If the chemical commodity council being evaluated represents a "Site A" chemical product (level 3, L3), the "Site A" chemical product can be further categorized into different chemical family groups (level 2, L2), chemical family is from "Site A", "Site B" or some "other" site if the chemical family does not fit into one of either sites A or B listed in level 3 (L3). Further, in an embodiment, the "other" site is categorized by whether or not the chemical commodity family fits under "lab chemicals" or under "non strategic" or is still an "other"

category (that is, the chemical does not fit into one of these two chemical families in the "other" categories in level 2 (L2). Furthermore, if the chemical family is categorized as a chemical family from Site A (L3), then the chemical family is further identified as any of the respective chemical families "A" through "Z" (L2). Similarly, if the chemical family is categorized as a chemical family from "Site B" (L3), then the chemical family can be further categorized as any of the chemical families A through Z (L2), which is not explicitly shown, but implied by the dotted line emanating from the "Site B" chemical family. As such, every piece of chemical spend data can be evaluated using one or more chemical council logic decision trees in order to classify and assign the chemical data facts into the lowest level of the chemical council hierarchy, so that the chemical council spend data can be rolled up or summarized from level 1 (L1) to level 4 (L4), using the level 1 linkage or entry or anchor point value assigned to a data fact. For instance, the anchor point reference numeral 604, conveys the fact that the data fact gets rolled up to the "lab chemicals" group (L2) and then gets rolled up to "other" chemical family (L3) and up to the "chemical" commodity council (L4), whereas, the anchor point reference numeral 606, conveys the fact that the data fact gets rolled up to the "non strategic" chemical family (L2) and then gets rolled up to "other" chemical family (L3) and up to the "chemical" product council (L4). Similarly, the anchor point reference numeral 608, conveys the fact that the data fact gets rolled up to the "A" chemical family (L2) and then gets rolled up to "Site A" chemical family (L3) and up to the "chemical" commodity council (L4), whereas, the anchor point reference numeral 610 conveys the fact that the data fact gets rolled up to the "Z" chemical family (L2) and then gets rolled up to "Site A" chemical family (L3) and up to the "chemical" commodity council (L4). Further, as shown in FIG. 6, any data fact that can be categorized as a chemical family product, but cannot be further categorize as either a "Site A" or a "Site B" chemical family is categorized into an "other" category and is assigned an anchor point reference numeral 602. Furthermore, any data fact that cannot be categorized as a chemical council is categorized and assigned an anchor point reference numeral 601, which signifies that the spend data does not belong in the chemical council classification. Also, in an embodiment, each level 1 inkage or entry or anchor point value assigned for a piece of data fact evaluated is based on certain spend mapping characteristics used for categorizing a particular chemical product. For instance, anchor point 601 uses certain data elements or spend characteristics 612, namely, data elements 1, 2 and 3, whereas, anchor point 602 uses spend characteristics 614, namely, data elements 1, 3 and 4. Similarly, anchor point 604 uses spend characteristics 616, namely, data elements 3, 4 and 5, whereas, anchor point 606 uses spend characteristics 618, namely, data elements 2 and 4. In addition, anchor point 608 is shown as using spend characteristics 620, namely, data elements 2 and 3, whereas, anchor point 610 is shown as using spend characteristics 622, namely, data elements 1, 4 and 5. As such, different chemical spend data facts can be evaluated using one or more chemical commodity council logic decision trees for categorizing and classifying the data facts into the lowest level of the chemical commodity council hierarchy.

Figure 7:
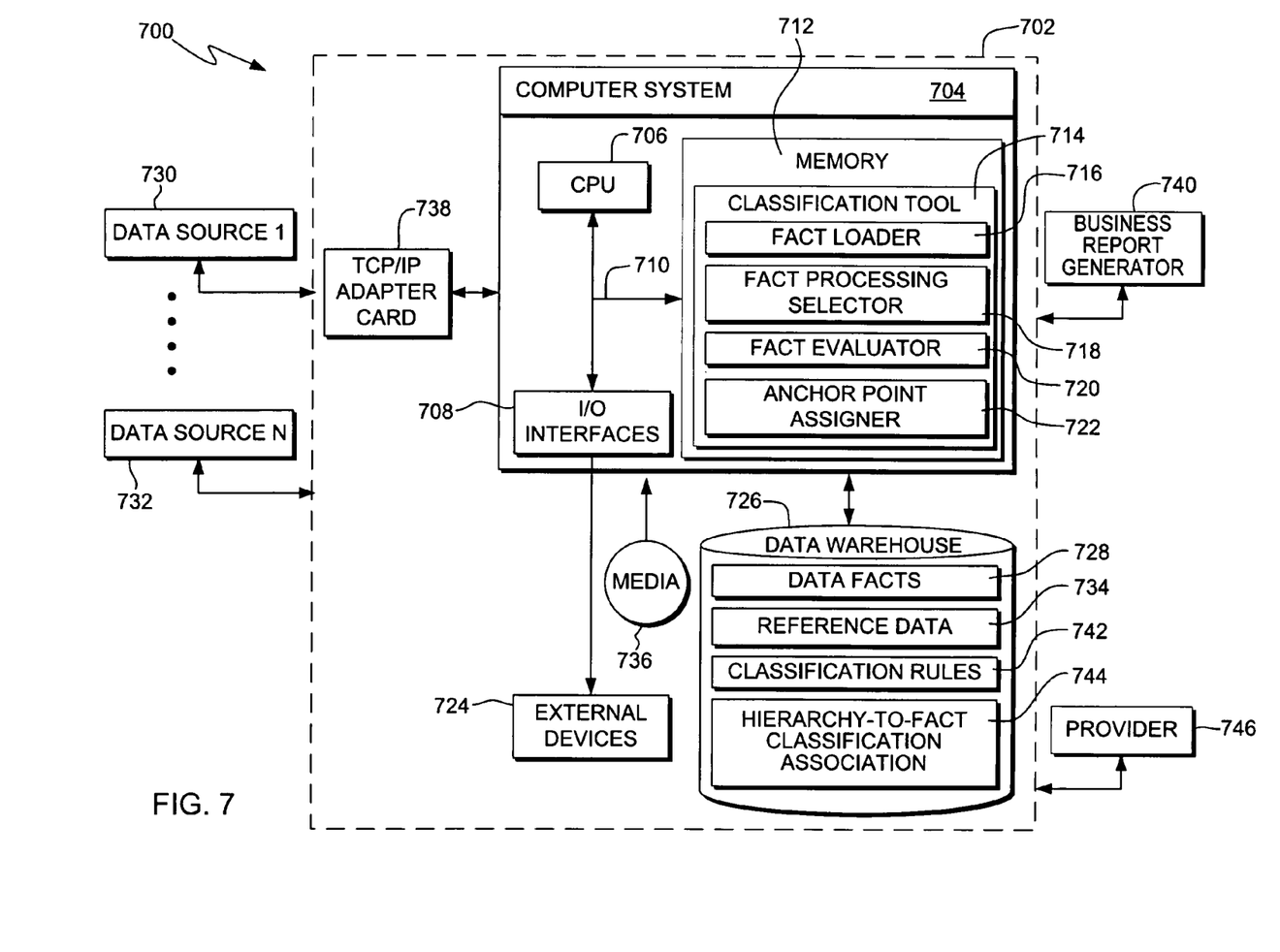
FIG. 7 depicts an embodiment of a computer system having deployed thereon a tool for dynamically assigning anchor points that are created for each identified business fact evaluated in order to classify data elements or facts into one or more hierarchies in a business, in accordance with an embodiment of the present invention.

Reference is now made to FIG. 7, reference numeral 700, which depicts a computer infrastructure for dynamically assigning anchor points that are created for each identified business fact evaluated in order to classify data elements or facts into one or more hierarchies in a business, in accordance with an embodiment of the present invention. In an embodiment, the computer infrastructure 700 includes a first computer system or server 704 that has stored within a local memory 712, a computer program product, namely, a classification program or tool 714, configured to classify data elements or facts into one or more hierarchies in a business. The computer program product comprises a computer readable or computer-usable storage medium, which provides program code or instructions, such as, the classification program or tool 714, for use by or in connection with a computer or any instruction execution system. As shown in FIG. 7, the computer system or server 704 has deployed thereon a classification tool 714 for classifying data facts into one or more hierarchies in a business. In an embodiment, as shown, the classification tool 714 includes a fact loader program 716, a fact processing selector program 718, a fact evaluator program 720, and an anchor point assigner program 722. The classification program or tool 714 can be loaded into computer system or server 704 from computer readable storage media 736, such as, a magnetic tape or disk, optical media, DVD, memory stick, semiconductor memory, etc. or downloaded from the Internet via a TCP/IP adapter card 738. As depicted in FIG. 7, the computer system or server 704 resides within computer infrastructure 702, which is intended to represent any type of computer architecture that is maintained in a secure environment (i.e., for which access control is enforced) by the owner. It should be understood, however, that although not shown, other hardware and software components (e.g., additional computer systems, routers, firewalls, etc.) could be included in infrastructure 702.

In general, the computer system or server 704 may access data source 1 (reference numeral 730) through data source N (reference numeral 732) for gathering data elements or facts that are to be classified into one or more hierarchies in a business. Further, the classification program or tool 714 running on the system or server 704 triggers the automatic classification of the data facts or elements into the one or more hierarchies of a business.

Further, the computer system or server 734 is shown to include a CPU (hereinafter "processing unit 736"), a memory 712, a bus 710, and input/output (I/O) interfaces 724. In general, processing unit 706 executes computer program code, such as, the classification tool 714 for dynamically assigning anchor points that are created for each identified business fact evaluated in order to classify data elements or facts into one or more hierarchies in a business. While executing computer program code, the processing unit 736 can read and/or write data to/from memory 712, data warehouse system 726, and/or I/O interfaces 708. For instance, in one embodiment, the classification program or tool 714 stores data facts 728 gathered from one or more data sources 1 through N (reference numeral 730 through 732) in data warehouse system 726 coupled to the computer system 704. Bus 710 provides a communication link between each of the components in computer system 704, such that information can be communicated within the infrastructure 702. External devices 724 can comprise any devices (e.g., keyboard, pointing device, display, etc.) that enable a user to interact with computer system 404 and/or any devices (e.g., network card, modem, etc.) that enable system or server 704 to communicate with one or more other computing devices.

Computer infrastructure 702 is only illustrative of various types of computer infrastructures for implementing the invention. For example, in an embodiment shown, computer infrastructure 702 comprises three or more computing devices (e.g., a server cluster) that communicate over a network to perform the various process steps of the invention. Moreover, computer infrastructure 702 is only representative of various possible computer systems that can include numerous combinations of hardware. To this extent, in other embodiments, computer infrastructure 702 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 706 may comprise a single processing unit or may be distributed across one or more processing units in one or more locations, e.g., on a client and server. Similarly, memory 712 and/or data warehouse system 726 can comprise any combination of various types of data storage that reside at one or more physical locations. Further, I/O interfaces 708 can comprise any system for exchanging information with one or more external devices 724. Still further, it is understood that one or more additional components (e.g., system software, math co-processing unit, etc.) not shown in FIG. 7 can be included in computer system 704. Data warehouse system 726 can be any type of system (e.g., a database) capable of providing storage for information under the present invention, such as, the data facts 728 and/or classification rules 742 to be classified by server or system 704. To this extent, data warehouse system 726 could include one or more storage devices, such as a magnetic disk drive or an optical disk drive. In another embodiment, data warehouse system 726 includes data distributed across, for example, a network. Although not shown, additional components, such as cache memory, communication systems, system software, etc., may be incorporated into computer infrastructure 702.

Accordingly, the invention provides a method, system and program product for assigning configurable anchor points to data facts or elements for classifying the data facts or elements into any hierarchy or hierarchies. In one embodiment, the rules are defined by the business and configured into the system, using business rules, for classifying data facts to the lowest level of a business hierarchy. A decision engine, for example, a binary tree, is used to evaluate data facts and assign each transaction or data fact to the appropriate lowest entry point of the hierarchy. A system is implemented to automate the process of collection and classification through the decision engine, and to warehouse the data facts with the dynamically assigned anchor or entry points. The warehoused data is summarized across relevant business dimensions and cross referenced to the hierarchy levels and business. A reporting portal is implemented to allow generation of reports, and detail drill downs utilizing the hierarchical levels. Business decisions are made based on comparisons of actual business results, measured consistently across all business areas through common business hierarchies, including areas with dissimilar business operations. As such, the dynamically created anchor points are directly tied to the base business transactions or data facts (for example, invoice line items) in a hierarchy and can support drilldowns to the detailed data enabling consistent cross organizational reporting and data comparisons. Furthermore; this invention allows for continual realignment and reprocessing through a consistent and repeatable process for maintaining the business classification rule base, which supports organizational change and evolution without the need to manage, adapt, and continually re-execute a complex set of manual adjustment processes. Further, in the invention, operational practices are captured in the business classification rule set and are then applied to the data. This approach enables the solution to deliver classification results that are fully aligned with the business's defined practices and deliver 100% classification accuracy. In addition the prioritized rule structure allows for grouping of data facts that are less important, not fully specified, or new/unknown data variations, to be classified into "Other" categories which can be monitored and analyzed for continuous improvement of business operations. Thus, as the business operations evolve, the new operational rules can be easily added to the classification rule set and then can be applied without code changes, sample data generation, or system re-training.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for classifying data elements, said method comprising the steps of:
   identifying a plurality of data elements stored in a data warehouse system to be classified into one or more levels of a business hierarchy and loading said plurality of data elements into a fact table in said data warehouse system;
   selecting a first logic decision tree of one or more logic decision trees for evaluating said plurality of data elements identified for classification of said plurality of data elements into said one or more levels of said business hierarchy, wherein said selecting step further comprises a step of providing a business rules database comprising said one or more logic decision trees corresponding to said one or more levels of said business hierarchy for classification of said plurality of data elements into said one or more levels of said business hierarchy, wherein each logic decision tree of said one or more logic decision trees comprises a binary decision tree;
   executing said first logic decision tree for recursively evaluating each data element of said plurality of data elements identified until said first logic decision tree has been traversed;
   dynamically creating configurable anchor point classifications for said plurality of data elements evaluated through said first logic decision tree; and
   assigning a respective anchor point classification to a respective data element evaluated, wherein said respective anchor point classification assigned to said respective data element evaluated links said respective data element to a lowest level of said one or more levels of said business hierarchy, and wherein said respective anchor point classification assigned to said respective data element of said plurality of data elements conveys classification information as to each higher level of said one or more levels of said business hierarchy that said respective data element belongs to, for facilitating hierarchical summarizing and reporting of said plurality of data elements across said business hierarchy.

2. The method according to claim 1, further comprising the step of: running each data element of said plurality of data elements through a second logic decision tree of said one or more logic decision trees for further classification of said plurality of data elements identified into said one or more levels of said business hierarchy.

3. The method according to claim 1, wherein said executing step further comprises the step of: evaluating, using said first logic decision tree, said each data element of said plurality of data elements for determining said respective anchor point classification of said each data element into said one or more levels of said business hierarchy.

4. The method according to claim 3, wherein said assigning step further comprises the step of: associating said respective anchor point classification dynamically created with said respective data element of said plurality of data elements, using one or more attributes of said respective data element.

5. The method according to claim 4, further comprising the step of: generating a report utilizing said respective anchor point classifications assigned to said plurality of data elements, wherein said report summarizes said plurality of data elements from a lower level up to a higher level of said one or more levels of said business hierarchy.

6. A computer system for classifying data elements, said computer system comprising:
   first program instructions to select a first logic decision tree for evaluating a plurality of data elements identified for classification of said plurality of data elements into one or more levels of a business hierarchy, said first program instructions including instructions to identify said plurality of data elements stored in a data warehouse system to be classified into one or more levels of said business hierarchy and to load said plurality of data elements into a fact table in said data warehouse system, wherein said first program instructions include instructions to provide a business rules database comprising one or more logic decision trees corresponding to said one or more levels of said business hierarchy for classification of said plurality of data elements into said one or more levels of said business hierarchy, wherein each logic decision tree of said one or more logic decision trees comprises a binary decision tree;
   second program instructions to execute said first logic decision tree selected from one or more logic decision trees for recursively evaluating each data element of said plurality of data elements identified until said first logic decision tree has been traversed;
   third program instructions to dynamically create configurable anchor point classifications for said plurality of data elements evaluated through said first logic decision tree; and
   fourth program instructions to assign a respective anchor point classification to a respective data element evaluated, wherein said respective anchor point classification assigned to said respective data element evaluated links said respective data element to a lowest level of said one or more levels of said business hierarchy, and wherein said respective anchor point classification assigned to said respective data element of said plurality of data elements conveys classification information as to each higher level of said one or more levels of said business hierarchy that said respective data element belongs to, for facilitating hierarchical summarizing and reporting of said plurality of data elements across said business hierarchy;
   a computer readable storage medium, said computer readable storage medium storing each of said first, second, third and fourth program instructions; and
   a central processing unit for executing each of said first, second, third and fourth program instructions.

7. The computer system according to claim 6, further comprising:
   fifth program instructions to run each data element of said plurality of data elements identified through a second logic decision tree of said one or more logic decision trees for further classification of said plurality of data elements identified into said one or more levels of said business hierarchy, and wherein said fifth program instructions are stored on said computer readable storage medium for execution by said central processing unit.

8. The computer system according to claim 7, wherein said second program instructions include instructions to evaluate, using said first logic decision tree, said each data element of said plurality of data elements for determining said respective anchor point classification of said each data element into said one or more levels of said business hierarchy.

9. The computer system according to claim 8, wherein said third program instructions include instructions to associate said respective configurable anchor point classification dynamically created with said respective data element of said plurality of data elements, using one or more attributes of said respective data element.

10. The computer system according to claim 9, wherein said third program instructions further include instructions to generate a report utilizing said anchor point classifications assigned to said plurality of data elements, wherein said report summarizes said plurality of data elements from a lower level up to a higher level of said one or more levels of said business hierarchy.

11. A computer program product for classifying data elements, said computer program product comprising:
   a computer readable storage medium;
   first program instructions to select a first logic decision tree for evaluating a plurality of data elements identified for classification of said plurality of data elements into one or more levels of a business hierarchy, said first program instructions including instructions to identify said plurality of data elements stored in a data warehouse system to be classified into one or more levels of said business hierarchy and to load said plurality of data elements into a fact table in said data warehouse system, wherein said first program instructions include instructions to provide a business rules database comprising one or more logic decision trees corresponding to said one or more levels of said business hierarchy for classification of said plurality of data elements into said one or more levels of said business hierarchy, wherein each logic decision tree of said one or more logic decision trees comprises a binary decision tree;
   second program instructions to execute the first logic decision tree selected from one or more logic decision trees for recursively evaluating each data element of said plurality of data elements identified until said first logic decision tree has been traversed;
   third program instructions to dynamically create configurable anchor point classifications for said plurality of data elements evaluated through said first logic decision tree; and
   fourth program instructions to assign a respective anchor point classification to a respective data element evaluated, wherein said respective anchor point classification assigned to said respective data element evaluated links said respective data element to a lowest level of said one or more levels of said business hierarchy, and wherein said respective anchor point classification assigned to said respective data element of said plurality of data elements conveys classification information as to each higher level of said one or more levels of said business hierarchy that said respective data element belongs to, for facilitating hierarchical summarizing and reporting of said plurality of data elements across said business hierarchy, and wherein each of said first, second, third and fourth program instructions are recorded on said computer readable storage medium.

12. The computer program product according to claim 11, further comprising:
fifth program instructions to run each data element of said plurality of data elements identified through a second logic decision tree of said one or more logic decision trees for further classification of said plurality of data elements identified into said one or more levels of said business hierarchy, and wherein said fifth program instructions are recorded on said computer readable storage medium.

13. The computer program product according to claim 12, wherein said second program instructions include instructions to evaluate, using said first logic decision tree, said each data element of said plurality of data elements for determining said respective anchor point classification of said each data element into said one or more levels of said business hierarchy.

14. The computer program product according to claim 13, wherein said third program instructions include instructions to associate said respective anchor point classification dynamically created with said respective data element of said plurality of data elements, using one or more attributes of said respective data element.

15. The computer program product according to claim 14, wherein said third program instructions further include instructions to generate a report utilizing said respective anchor point classifications assigned to said plurality of data elements, wherein said report summarizes said plurality of data elements from a lower level up to a higher level of said one or more levels of said business hierarchy.

16. A process for deploying computing infrastructure comprising integrating computer-readable code into a computing system, wherein said code in combination with said computing system is capable of performing a process for classifying data elements, said process comprising:
identifying a plurality of data elements stored in a data warehouse system to be classified into one or more levels of a business hierarchy and loading said plurality of data elements into a fact table in said data warehouse system;
selecting a first logic decision tree of one or more logic decision trees for evaluating said plurality of data elements identified for classification of said plurality of data elements into said one or more levels of said business hierarchy, wherein said selecting step further comprises providing a business rules database comprising said one or more logic is decision trees corresponding to said one or more levels of said business hierarchy for classification of said plurality of data elements into said one or more levels of said business hierarchy, wherein each logic decision tree of said one or more logic decision trees comprises a binary decision tree;
executing said first logic decision tree for recursively evaluating each data element of said plurality of data elements identified until said first logic decision tree has been traversed;
dynamically creating configurable anchor point classifications for said plurality of data elements evaluated through said first logic decision tree;
assigning a respective anchor point classification to a respective data element evaluated, wherein said respective anchor point classification assigned to said respective data element evaluated links said respective data element to a lowest level of said one or more levels of said business hierarchy, and wherein said respective anchor point classification assigned to said respective data element of said plurality of data elements conveys classification information as to each higher level of said one or more levels of said business hierarchy that said respective data element belongs to, for facilitating hierarchical summarizing and reporting of said plurality of data elements across said business hierarchy; and
generating a report utilizing said respective anchor point classifications assigned to said plurality of data elements, wherein said report summarizes said plurality of data elements from a lower level up to a higher level of said one or more levels of said business hierarchy.

17. The process according to claim 16, further comprising:
running each data element of said plurality of data elements through a second logic decision tree of said one or more logic decision trees for further classification of said plurality of data elements identified into said one or more levels of said business hierarchy.

18. The process according to claim 17, wherein said executing step further comprises:
evaluating, using said first logic decision tree, said each data element of said plurality of data elements for determining said respective anchor point classification of said each data element into said one or more levels of said business hierarchy.

19. The process according to claim 18, wherein said assigning step further comprises:
associating said respective anchor point classification dynamically created with said respective data element of said plurality of data elements, using one or more attributes of said respective data element.

* * * * *